United States Patent Office 3,635,863
Patented Jan. 18, 1972

3,635,863
METHOD OF IMPROVING BITUMINOUS MATERIALS
John J. Drukker, Wyckoff, N.J., assignor to The Flintkote Company, White Plains, N.Y.
No Drawing. Continuation-in-part of application Ser. No. 686,693, Nov. 29, 1967. This application Dec. 16, 1969, Ser. No. 885,610
Int. Cl. C08d 9/12
U.S. Cl. 260—27    16 Claims

ABSTRACT OF THE DISCLOSURE

There is disclosed herein a method for modifying the properties of bituminous materials by dispersing in such materials at a temperature below about 220° F. a water-in-oil emulsion of an aqueous elastomeric polymer in an oil carrier, and thereafter evaporating water from the aqueous phase at a temperature below about 275° F.

---

This application is a continuation-in-part of copending application Ser. No. 686,693 filed Nov. 29, 1967.

This invention relates to an improved method for combining elastomeric polymers into bituminous materials.

It is known that properties such as the adhesion, cohesion, plasticity, flexibility and flowability of bituminous materials, for example, asphalt and tar, can be modified by incorporating into the bituminous material a finely dispersed elastomeric polymer. A number of U.S. patents disclose such modified bituminous materials, including No. 2,504,605, No. 2,686,166, No. 2,830,963, No. 2,841,060, No. 2,868,749, No. 2,921,105, No. 2,978,427, No. 2,989,494, No. 2,996,467 and Nos. 3,010,026–28. Some of the methods disclosed in such patents, however, do not result in desirably fine or uniform dispersions of the polymeric material in the bituminous material.

It is an object of this invention to provide an improved method for dispersing an elastomeric polymer, especially a synthetic rubber, in a bituminous material. It is also an object of this invention to provide a process for incorporating a synthetic rubber in very uniformly and finely dispersed state into a bituminous material. These and other objects of this invention will be in part discussed and in part apparent in the following more detailed disclosure.

Broadly this invention involves the making of a modified bituminous material by dispersing in a bituminous material such as asphalt or coal tar pitch in water-in-oil emulsion of an aqueous phase elastomeric polymer, such as a synthetic latex material, emulsified in an oil carrier therefor, preferably together with a stabilizer compatible with both the latex and the oil, initially at a relatively low temperature, and subsequently evaporating the aqueous phase of the dispersed latex.

More specifically, in a presently preferred form of the invention, the stabilized aqueous latex water-in-oil carrier emulsion is uniformly dispersed in the bituminous material with constant agitation, for example as provided by a stirrer, blender or circulating pump, at a temperature below about 220° F., preferably at a temperature in the range of about 170° F. and about 215° F., and advantageously at a temperature in the range of about 190° F. and about 212° F. The oil carrier phase of the water-in-oil emulsion dissolves in the bituminous material, leaving the aqueous latex phase of the emulsion uniformly dispersed in the bituminous material as fine particles in the order of less than about five microns. The water of the thus dispersed aqueous latex phase is then evaporated, preferably by increasing the temperature of the bituminous material to a temperature in the range of about 215° F. to about 275° F., and advantageously to a temperature in the range of about 220° F. to about 260° F., to promote evaporation of the water. At lower temperatures within those ranges, the evaporation time is, of course, longer. The evaporation desirably is at a substantially uniform rate whereby rapid flashing is minimized or avoided altogether. An antifoaming agent can be used to reduce foaming.

Under these conditions a very uniform dispersion of finely divided solid rubber particles, in the order of about 1 to about 15 microns, can be obtained. By contrast it has been found that in blending the water-in-oil emulsion into the bituminous material at a temperature substantially above 220° F., for example, at about 275° F., the water tends to flash off too rapidly, causing coagulation of the dispersed latex and formation of particles that are large, irregular and stringy, e.g., about 20 by about 150 microns in size.

It presently appears that the modification of the original viscosity characteristics of the bituminous material, to provide good flow properties at normal working temperatures, and the size and uniformity of the dispersed rubber particles are mainly a function of the amount of rubber incorporated into the bituminous material. Although systems having workable viscosities can contain up to about 10% rubber in the bitumen, the preferred range of solid rubber particles dispersed in the bituminous material is about ½% to about 5% by weight.

Various bituminous materials can be used, such as asphalt and coal tar pitch, that are conveniently mixable and pumpable at the temperature at which the water-in-oil emulsion is added. Suitable asphaltic materials should have a viscosity at 212° F. of from about 500 to about 7500 centipoises, preferably from about 1500 to about 5000, a ductility at 77° F. of from about 70 to about 200 cm., and a softening point of from about 85° F. to about 150° F., preferably from about 100 to about 130° F. Suitable coal tar pitches should have a consistency measured by the float test of from about 50 sec. to about 250 sec. at 50° C., preferably about 100 to about 200 sec., and a softening point of from about 35° C. to about 90° C., preferably 50° C. to 70° C.

In another aspect of the presently preferred form of the invention, the stabilized emulsion is prepared by dispersing a stabilizer in the oil carrier at a tempertture in the range of about 120° F. to about 160° F., cooling the oil-stabilizer dispersion, and then blending the aqueous synthetic latex phase into the oil-stabilizer dispersion at a temperature in the range of about 60° F. to about 110° F. to form a stabilized water-in-oil emulsion. The consistency of the emulsion can vary from medium to viscous, depending upon the specific latex, oil carrier and stabilizer, and the proportion in which they are used. The particle size of the emulsified latex is in the order of about 1 to about 3 microns. Thereafter the emulsion is uniformly dispersed in the bituminous material as previously described.

Latexes suitable for incorporation into bituminous materials according to the method of this invention include the ones commonly used for making "synthetic rubber" and are polymers derived principally from butadiene and butylene. Of particular importance presently are latexes of styrene-butadiene copolymers, so-called "SRB," butadiene-acrylonitrile copolymers, so-called "nitrile rubbers," butadiene-acrylic acid copolymers, polybutadiene polymers, 2-chloro-1,3-butadiene polymers, so-called "neoprene," and isobutylene-isoprene copolymers, so-called "butyl rubber." The first two types are preferred. The ratio of comonomers in the latex can vary widely, as is known to persons skilled in the art, and does not appear to be critical to the efficacy of the present process. Similarly, the solids content of the aqueous latex can vary widely. It is desirable, however, from a practical standpoint to have a relatively high solids content, for example in the order of about 45% to about 75% resin solids by weight of the aqueous latex, to lessen the amount of water to be evaporated.

The oil carrier phase for the aqueous latex water-in-oil emulsion can be a variety of organic materials having low to medium viscosity that are soluble, or absorbable, in the bituminous material to be modified and that form compatible emulsions with the aqueous latex. Principal among such carriers are naphthenic petroleum oils and coal tar distillates of low to medium viscosity. The naphthenic oil should have a viscosity of from about 100 to about 700 Saybolt Seconds Universal at 100° F., preferably about 150 to 550, a flash point of over about 350° F., an aniline point of from about 150 to about 175° F., and an A.P.I. gravity of from about 18 to 23 at 60° F. The coal tar distillate should have about the same viscosity, although generally toward the lower end of the range, and flash point, and a specific gravity of from about 1.11 to about 1.15.

Although the amount of the aqueous latex phase in the emulsion can vary over fairly wide limits, it desirably should be in the range of about 35% to about 65% by weight, preferably about 45% to 50%. Advantageously, the aqueous latex and the oil carrier phases in the emulsion are used in about the same amount. From about 1% to about 10% by weight of a stabilizer desirably is also included in the emulsion. Stabilizers for such aqueous latex water-in-oil emulsions are known in the art, and include rosin soaps, for example of the potassium or sodium type such as Dresinate 731 and 214 polyoxyethylated alkyl-phenols, for example Igepal CO 730, a polyoxyethylated nonyl-phenol polyoxyethylene ether alcohols, for example Renex 31, a polyoxyethylene tridecyl alcohol, polyoxyethylene sorbitan fatty acid esters, for example Tween 60, 65, 80 and 85, which are the stearate, tristearate, oleate and trioleate esters, respectively, alkyl-aromatic polyethylene glycol ethers, for example the Tergitol nonyl-phenol, dodecyl-phenol and alkylphenyl polyethylene glycol ethers, and ethoxysulfates, for example Neodal 25–3S.

The amount of the aqueous latex water-in-oil emulsion to be incorporated into the bituminous material varies and depends upon the amount of rubber solids desired to be dispersed throughout the bituminous material, which amount, in turn, depends upon the modified properties sought. In general from about ½% to about 5% of dispersed rubber particles provides modified bituminous material having broadly applicable improved properties of elasticity, flexibility, strength, ageing and resistance to flow. Thus from about 1 to about 20 parts by weight of the water-in-oil emulsion per 100 parts of bituminous material can be used, preferably about 3 to about 10 parts of the emulsion.

Bituminous materials modified by the process of this invention have a variety of uses. They can be used, for example, in making roadway and driveway paving materials, roofing, siding and other building construction materials, protective and sealing coatings for wood, paper, concrete and the like, and adhesives. The modified bituminous materials can be utilized in the form of a hot melt or as a base to be emulsified, or they can be fluidized with a solvent.

The following examples illustrate the invention.

EXAMPLE 1

A stabilized aqueous latex water-in-oil carrier emulsion was prepared by dispersing 9 parts (by weight unless otherwise specified) of rosin acid soap into 45.5 parts of a naphthenic oil at about 150° F. The rosin soap was of the sodium type having a pale color, an acid number of 11, a viscosity of 37 poises at 140° F. and containing 70% solids. The naphthenic oil carrier had an A.P.I. gravity of 18, a viscosity of 520 S.S.U. at 100° F., 210 S.S.U. at 130° F., an aniline point of 175° F. and a flash point of 400° F. 45.5 parts of an aqueous latex of a butadieneacrylonitrile copolymer, i.e., 50% total solids, pH of 6.5, specific gravity of 1.0, viscosity of 57 centipoises at 77° F. and film-forming at 77° F., were then added slowly and dispersed in the oil carrier at about 80° F. during high speed mixing. The resulting water-in-oil emulsion had a soft greasy consistency, a copolymer solids content of about 23% and was stable during storage for six months. The aqueous latex phase was uniformly dispersed in the oil phase as particles of less than about 3 microns. About 4.4 parts of the stabilized emulsion then were dispersed into about 100 parts of continuously agitated coal tar pitch, RT–12, at about 175° F. The RT–12 has a specific gravity of 1.16 at 25° C., a float test of 150–220 sec. at 50° C., a softening point of about 70° C., and 25% max. carbon disulfide insolubles. The oil carrier outer phase dissolved into the coal tar pitch, and the aqueous latex phase was released as uniformly dispersed particles of less than about 5 microns. The agitated dispersion was then slowly heated to about 260° F. to evaporate water from the aqueous phase. An antifoaming agent was used to minimize foaming. After evaporation the solid resin particles were less than about 2 microns and uniformly dispersed. The resin content of the modified bituminous material was about 1%. Table 1 in Example 2 shows the temperature-viscosity characteristics of the modified material.

EXAMPLE 2

Following the procedure and using the ingredients described in Example 1, a modified bituminous material was prepared except that about 14.5 parts of the emulsion were used so that the content of the rubber solids, which were uniformly dispersed particles of less than about 2 microns, comprised about 3%. Table 1 shows the viscosity data of the coal tar pitch, modified according to this example and Example 1, and unmodified.

TABLE 1

| | Centipoises | | |
|---|---|---|---|
| ° F. | Unmodified pitch | Example 1 modified | Example 2 modified |
| 220 | | | 740 |
| 210 | | 400 | 950 |
| 200 | | 600 | 1,200 |
| 190 | 500 | 900 | 2,000 |
| 180 | 780 | 1,350 | 3,100 |
| 170 | 1,200 | 1,900 | 4,100 |
| 160 | 1,750 | 3,100 | |

The shear strength of the modfied bituminous material prepared according to Example 2 was tested by applying about 0.5 gm. per square inch onto two pieces of plywood. The coated surfaces were combined to form a panel which was tested at 80° F. at a pull rate of 3 inches per minute. The shear strength was found to be 9 p.s.i. A similar panel was made with unmodified RT–12 coal tar pitch and found to have a shear strength of 1.5 p.s.i.

EXAMPLE 3

A modified bituminous material was prepared following the procedures described in Example 1 except that the stabilized aqueous latex water-in-oil carrier emulsion contained 48.75 parts of coal tar distillate, 48.75 parts of the butadiene-acrylonitrile copolymer aqueous latex and 2.5 parts of a polyoxyethylated stabilizer. The coal tar distillate had a specific gravity of 1.13, distillates at 300° C. of 8.6% and at 355° C. of 48.0%, a coke residue of 1.4% and benzene insolubles of 0.2%. The stabilizer was polyoxyethylated nonyl-phenol having a density of 1.07 at 25° C., a viscosity of 500–600 centipoises at 25° C., a solidification point of 68° F. and a flash point of over 500° F. About 4.3 parts of the stabilized emulsion were dispersed in 100 parts of coal tar pitch, RT–12, at about 175° F. to provide a modified bituminous material having about 1% resin solids content in one instance, and in another about 14 parts of the emulsion were dispersed to provide a modified pitch having about 3% resin solids content. The results were substantially the same as those described in Examples 1 and 2.

EXAMPLE 4

A stabilized aqueous latex water-in-oil carrier emulsion was prepared as described in Example 1 except that it contained 47.5 parts of the naphthenic oil carrier, 5.0 parts of the resin soap stabilizer and 47.5 parts of an aqueous butadiene-styrene latex. The latex contained 62% total solids and 44% bound styrene, and had a specific gravity of 1.0, a pH of 10.5 and a viscosity of 500 centipoises at 77° F. About 3.5 parts of the emulsion were dispersed initially at 200° F. in 100 parts of a steam refined asphalt (S.P. 110–120° F.).

PROPERTIES OF STEAM-REFINED ASPHALTS [1]

|  | A | | B | | C | |
|---|---|---|---|---|---|---|
|  | Min. | Max. | Min. | Max. | Min. | Max. |
| Softening point (° F.) | 100 | | 108 | 118 | 118 | 128 |
| Penetration (77° F.) | 180 | 200 | 100 | 120 | 50 | 60 |
| Flash C.O.C. (° F.) | 500 | | 500 | | 500 | |
| Spec. grav. (77° F.) | 1.00 | 10.4 | 1.00 | 1.04 | 1.00 | 1.04 |
| Solubility in CS$_2$ | 99.5 | | 99.5 | | 99.5 | |
| Ductility (5 cm./min., 77° F.) | 100 | | 100 | | 100 | |

[1] Type B was used in this example.

The aqueous latex was uniformly dispersed in the asphalt as particles of about 3 microns. The temperature of the dispersion, which was continually agitated, was increased gradually to about 275° F. After the water had evaporated the resin solids content was about 1% as particles of 2 to 15 microns.

For comparative purposes the stabilized emulsion was dispersed in the asphalt at about 275° F. The water volatilized rapidly, and the resin particles in the thus modified bituminous material coagulated to form irregular and stringy particles about 20 by about 150 microns. The following table shows the measured viscosities of the asphalt and the modified asphalt.

TABLE 2

| ° F. | Poises | | |
|---|---|---|---|
|  | Asphalt unmodified | Asphalt modified by claimed process | Asphalt modified by other process |
| 220 | | 20 | 20 |
| 210 | 15 | 30 | 28 |
| 200 | 38 | 75 | 60 |
| 190 | 80 | 100 | 85 |
| 180 | 135 | 160 | 140 |
| 170 | 220 | 300 | 280 |

EXAMPLE 5

An unstabilized water-in-oil emulsion was made with equal parts of the naphthenic oil carrier of Example 1 and a butadiene-styrene latex containing 55% butadiene and 69% resin solids. The emulsion had a viscosity of 50 cps. Ten parts of the emulsion were added to 200 parts of the asphalt described in Example 4 at 200° F. Water of the emulsion was vaporized by raising the temperature of the asphalt to 260° F. The resin solids in the modified asphalt were uniform as particles 3 to 5 microns. When the emulsion was added to the asphalt at 275° F., the resin solids were found to be irregular and some about 20 microns and others about 150 to 300 microns.

EXAMPLE 6

Seven parts of polyoxyethylene sorbitan oleate stabilizer, Tween 80, were added to a naphthenic oil at 80°–150° F. The naphthenic oil had a viscosity of 156 S.U.S. at 100° F., an A.P.I. gravity of 22.4 at 60° F., a flash point of 350° F., and an aniline point of 156° F. The blend was cooled to about 75° F. and 46.5 parts of Latex #2107 were added to form a soft, greasy water-in-oil emulsion. Latex #2107 is a styrene-butadiene aqueous latex containing 44% styrene and 61% solids. Five and a half parts of the stabilized emulsion were added with mixing to 94.5 parts of asphalt (Type B of Example 4) at 190° F. to 210° F. until the oil carrier phase dissolved in the asphalt and the aqueous latex phase was uniformly dispersed therein. Thereafter the water of the aqueous latex phase was evaporated by slowly raising the temperature of the asphalt, with mixing, to between about 260° and 280° F. Rubber particles in the amount of 1.5% and of 3 to 6 microns were uniformly dispersed in the thus modified asphalt.

EXAMPLE 7

A modified asphalt was made as described in Example 6 except that nonyl-phenyl polyethylene glycol ether, Tergitol NP 27, was used as stabilizer for the water-in-oil emulsion. The rubber particles were 3 to 6 microns and uniformly dispersed.

EXAMPLE 8

A modified asphalt was made as described in Example 6 except that ethoxysulfate, Neodol 25–3S, was used as stabilizer for the water-in-oil emulsion. The rubber particles were 3 to 6 microns and uniformly dispersed.

EXAMPLE 9

A modified asphalt was made as described in Example 6 except that polyoxyethylene tridecyl alcohol, Renex 31, was used as stabilizer for the water-in-oil emulsion. The rubber particles were 3 to 6 microns and uniformly dispersed.

It is of course to be understood that numerous changes in the ingredients, proportions and conditions set forth in the foregoing examples can be made by persons skilled in the art without departing from the scope of the invention as disclosed herein above and as defined in the appended claims.

I claim:

1. A method of making a modified bituminous material which comprises: dispersing at a temperature below about 220° F. in a mixable and pumpable bituminous material, which bituminous material is an asphalt having a viscosity at 212° F. of from about 500 to about 7500 centipoises, a ductility at 77° F. from about 70 to about 200 cm. and a softening point of from about 85° F. to about 150° F. or is a coal tar pitch having a consistency (float test) of from about 50 to about 250 sec. at 50° C. and a softening point of from about 35° C. to about 90° C., a water-in-oil emulsion having an aqueous butylene or butadiene synthetic rubber latex dispersed phase and an oil carrier continuous phase, said oil carrier being a naphthenic petroleum oil or a coal tar distillate of low to medium viscosity; and thereafter evaporating water from the aqueous latex phase of said emulsion dispersed in said bituminous material at a temperature of about 215° F. to about 260° F.

2. A method of making a modified bituminous material according to claim 1 wherein said emulsion is dispersed in said bituminous material at a temperature of about 170° F. to about 215° F.

3. A method of making a modified bituminous material according to claim 1 wherein said water is evaporated at a temperature of about 220° F. to about 260° F.

4. A method of making a modified bituminous material according to claim 1 wherein said emulsion is dispersed in said bituminous material at a temperature of about 190° F. to about 215° F. and thereafter the temperature of said bituminous material is raised to a temperature between about 220° F. and about 260° F. to evaporate said water.

5. A method of making a modified bituminous material according to claim 1 wherein said emulsion is dispersed in said bituminous material in an amount such that the rubber solids comprise about ½% to about 5% by weight of the modified bituminous material.

6. A method of making a modified bituminous material according to claim 1 wherein said synthetic rubber is a butadiene-styrene copolymer.

7. A method of making a modified bituminous material according to claim 1 wherein said synthetic rubber is a butadiene-acrylonitrile copolymer.

8. A method of making a modified bituminous material according to claim 1 wherein said oil carrier has a viscosity of from about 100 to about 700 SSU at 100° F. and a flash point of at least about 350° F.

9. A method of making a modified bituminous material according to claim 1 wherein said emulsion contains from about 35% to about 65% by weight each of said aqueous latex and said oil carrier.

10. A method of making a modified bituminous material according to claim 1 wherein said emulsion contains up to about 10% of a stabilizer for said aqueous latex water-in-oil carrier emulsion.

11. A method of making a modified bituminous material according to claim 1 wherein said bituminous material containing said dispersed emulsion is continuously agitated until the water evaporates.

12. A method of making a modified bituminous material according to claim 1 which further comprises blending said aqueous latex and said oil carrier together at a temperature of about 60° F. to about 110° F. to form said water-in-oil emulsion, and thereafter dispersing said emulsion in said bituminous material.

13. A method of making a modified bituminous material according to claim 10 which further comprises dispersing said stabilizer in said oil carrier at a temperature of about 120° F. to about 160° F., blending said aqueous latex and said stabilizer-oil carrier emulsion at a temperature of about 60° F. to about 110° F. to form said stabilized water-in-oil emulsion, and thereafter dispersing said emulsion in said bituminous material.

14. A method of making a bituminous material according to claim 1 wherein said asphalt has a viscosity at 212° F. of from about 1500 to about 5000 centipoises and a softening point of from about 100° F. to about 130° F., and said coal tar pitch has a consistency (float test) of from about 100 to about 200 sec. at 50° C. and a softening point of from about 50° C. to about 70° C.

15. A method of making a modified bituminous material according to claim 1 wherein said synthetic rubber is a styrene-butadiene copolymer, a butadiene-acrylonitrile copolymer, a butadiene-acrylic acid copolymer, a polybutadiene polymer, a 2-chloro-1, 3-butadiene polymer, or an isobutylene-isoprene copolymer.

16. A method of making a modified bituminous material according to claim 9 wherein said stabilizer is sodium or potassium rosin soap, polyoxyethylated nonyl-phenol, polyoxyethylene tridecyl alcohol, polyoxyethylene sorbitan stearate, tristearate, oleate or trioleate, nonyl-phenol or dodecyl-phenol polyethylene glycol ether, or ethoxy sulfate.

References Cited

UNITED STATES PATENTS

| | | | |
|---|---|---|---|
| 2,504,605 | 4/1950 | Thomas | 260—745 |
| 2,506,339 | 5/1950 | Buckley | 260—28.5 |
| 2,978,351 | 4/1961 | Pullar | 260—28.5 |
| 2,978,427 | 4/1961 | Pullar et al. | 260—28.5 |
| 2,996,467 | 8/1961 | Hawley et al. | 260—28.5 |
| 3,223,696 | 12/1965 | Boylan et al. | 260—100 |
| 3,412,061 | 11/1968 | Drukker | 260—745 |
| 3,493,408 | 2/1970 | Drukker | 260—745 |

HOSEA E. TAYLOR, Primary Examiner

W. E. PARKER, Assistant Examiner

U.S. Cl. X.R.

260—28.5, 745, 758

PO-1050
(5/69)

UNITED STATES PATENT OFFICE
CERTIFICATE OF CORRECTION

Patent No. 3,635,863    Dated 1/18/72

Inventor(s) John J. Drukker

It is certified that error appears in the above-identified patent and that said Letters Patent are hereby corrected as shown below:

Col. 1, line 34, change "026" to -- 926 --; Col. 1, line 48, change "in" to -- a --; Col. 2, line 61, change "SRB" to -- SBR --; Col. 5, line 8, change "resin" to -- rosin --; Col. 5, line 55, change "50" to -- 500 --; Col. 8, line 11, change "9" to -- 10 --.

Signed and sealed this 13th day of June 1972.

(SEAL)
Attest:

EDWARD M. FLETCHER, JR.        ROBERT GOTTSCHALK
Attesting Officer              Commissioner of Patents